(12) United States Patent
Kumar et al.

(10) Patent No.: US 12,133,157 B2
(45) Date of Patent: Oct. 29, 2024

(54) SYSTEM AND METHODS FOR USER EQUIPMENT STORING REJECTED NETWORK SLICE SELECTION ASSISTANCE INFORMATION PER ACCESS TYPE

(71) Applicant: Samsung Electronics Co., Ltd., Suwon-si (KR)

(72) Inventors: Lalith Kumar, Bangalore (IN); Koustav Roy, Bangalore (IN); Arijit Sen, Bangalore (IN); Danish Ehsan Hashmi, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 17/815,502

(22) Filed: Jul. 27, 2022

(65) Prior Publication Data

US 2023/0031697 A1    Feb. 2, 2023

(30) Foreign Application Priority Data

Jul. 28, 2021 (IN) .............................. 202141034003
Jun. 29, 2022 (IN) .............................. 202141034003

(51) Int. Cl.
*H04W 48/02* (2009.01)
*H04W 60/00* (2009.01)

(52) U.S. Cl.
CPC ........... *H04W 48/02* (2013.01); *H04W 60/00* (2013.01)

(58) Field of Classification Search
CPC ..... H04W 48/18; H04W 76/18; H04W 48/06; H04W 60/00; H04W 60/06; H04W 48/02; H04W 76/10; H04W 48/16; H04W 28/08
See application file for complete search history.

(56) References Cited

U.S. PATENT DOCUMENTS

2019/0029065 A1* 1/2019 Park ...................... H04W 8/08
2019/0313277 A1   10/2019 Huang-Fu et al.
(Continued)

FOREIGN PATENT DOCUMENTS

WO    2020250005 A1    12/2020
WO    2021024995 A1    2/2021

OTHER PUBLICATIONS

3GPP, TS24.501 v17.3.1, Non-Access-Stratum (NAS) protocol for 5G System (5GS); Stage 3, Jul. 2, 2021 See sections 3.1, 4.4.1, 4.6.2.2, 4.6.2.3, 4.6.2.5, 5.4.4.1. (Year: 2021).*

(Continued)

*Primary Examiner* — Allahyar Kasraian

(57) ABSTRACT

A method and system in the User Equipment (UE) for maintaining rejected network slice selection assistance information (NSSAI) for Single Network Slice Selection Assistance Information (S-NSSAI) not available due to maximum number of UEs reached per access type. The method comprises receiving a Non-Access Stratum (NAS) message including at least one of a registration accept, registration reject or CONFIGURATION UPDATE COMMAND message along with at least one of rejected Single Network Slice Selection Assistance Information (S-NSSAI(s)) information and a cause for the S-NSSAI not available due to maximum number of UEs reached from a network. Thereafter, the method includes determining by the UE an access type on which the rejected S-NSSAI(s) is applicable based on the received S-NSSAI(s) information and then maintaining a storage of the rejected NSSAI for the S-NSSAI not available due to the maximum number of the UEs reached per access type based on the determination.

12 Claims, 6 Drawing Sheets

(56) References Cited

U.S. PATENT DOCUMENTS

| | | | |
|---|---|---|---|
| 2020/0137552 A1* | 4/2020 | Park | H04W 60/06 |
| 2020/0413241 A1* | 12/2020 | Park | H04W 76/22 |
| 2021/0212010 A1* | 7/2021 | Lee | H04W 60/005 |
| 2022/0232507 A1* | 7/2022 | Kim | H04W 60/04 |
| 2022/0279430 A1 | 9/2022 | Tamura et al. | |
| 2022/0369207 A1* | 11/2022 | Ianev | H04W 76/18 |

OTHER PUBLICATIONS

Samsung, S2-2104897, NSAC with consideration of access type, 3GPP TSG SA WG2 #145E, May 28, 2021 See the whole document. (Year: 2021).*

Ericsson, C1-212182, S-NSSAI rejected due to maximum number of UEs reached, 3GPP TSG CT WG1 #129E, Apr. 12, 2021 See section 5.4.4.3. (Year: 2021).*

Supplementary European Search Report dated Nov. 6, 2023, in connection with European Patent Application No. 22849886.1, 12 pages.

Samsung, "NSAC with consideration of access type", S2-2104897, 3GPP TSG-SA WG2 Meeting #145-E, May 17-28, 2021, 5 pages.

Samsung: "Per access Rejected NSSAI for the maximum number of UEs reached", C1-214615, 3GPP TSG-CT WG1 Meeting #131-e, E-meeting, Aug. 19-27, 2021, 17 pages.

International Search Report and Written Opinion of the International Searching Authority dated Oct. 26, 2022, in connection with International Application No. PCT/KR2022/011058, 8 pages.

3GPP TS 24.301 V17.3.0 (Jun. 2021), Technical Specification, 3rd Generation Partnership Project; Technical Specification Group Core Network and Terminals; Non-Access-Stratum (NAS) protocol for Evolved Packet System (EPS); Stage 3 (Release 17), Jun. 2021, 563 pages.

3GPP TS 24.501 V17.3.1 (Jun. 2021), Technical Specification, 3rd Generation Partnership Project; Technical Specification Group Core Network and Terminals; Non-Access-Stratum (NAS) protocol for 5G System (5GS); Stage 3; (Release 17), Jun. 2021, 825 pages.

Ericsson, "S-NSSAI rejected due to maximum number of UEs reached," C1-212182, 3GPP TSG-CT WG1 Meeting #129-e, Electronic meeting, Apr. 19-23, 2021, 105 pages.

Zte, et al., "Introduction of Network Slice Admission Control," C1-213688 (C1-212389), 3GPP TSG-CT WG1 Meeting #130-3, Electronic meeting, May 20-28, 2021, 20 pages.

Examination report dated Mar. 3, 2023, in connection with Indian Application No. 202141034003, 5 pages.

Office Action dated Jan. 30, 2024, in connection with Korean Application No. 10-2023-007816, 9 pages.

* cited by examiner

SYSTEM AND METHODS FOR USER EQUIPMENT STORING REJECTED NETWORK SLICE SELECTION ASSISTANCE INFORMATION PER ACCESS TYPE

CROSS-REFERENCE TO RELATED APPLICATIONS

This application is based on and claims priority under 35 U.S.C. § 119(a) of an Indian provisional patent application number 202141034003, filed on Jul. 28, 2021, in the Indian Patent Office, and of an Indian Complete patent application number 202141034003, filed on Jun. 29, 2022, in the Indian Patent Office, the disclosure of each of which is incorporated by reference herein in its entirety.

BACKGROUND

1. Field

The present disclosure generally relates to system and methods for user equipment for maintaining rejected network slice selection assistance information (NSSAI) per access type. In particular, the present disclosure relates to a method and system for maintaining rejected network slice selection assistance information (NSSAI) for Single Network Slice Selection Assistance Information (S-NSSAI) not available due to maximum number of UEs reached per access type.

2. Description of Related Art

The next-generation mobile communication systems need to support huge data traffic, an increase of data transmission rate per user, significantly increased number of connected mobile devices, and low latency with the ever increasing requirement of data speed in mobile devices. The 5th generation (5G) technology utilizes the concept of network slicing for realizing ever increasing requirement of data speed in mobile devices. Specifically, the network slicing is a 5G concept which is used to realize dedicated connectivity services over network service provider networks. 5G introduces a concept of Network Slice Selection Assistance Information (NSSAI) to assist slice selection. The NSSAI consists of a list of Single NSSAIs (S-NSSAIs).

FIG. 1 illustrates an exemplary network environment of the User Equipment (UE) connected with a network, according to the state of the art. As can be seen from the FIG. 1, the UE 101 may be connected with the network 103 over any of the access types. The access type may include 3GPP access or non-3GPP (N3GPP) access. Further, for the exemplary purpose, only one UE is shown in the FIG. 1, however there can be more than one UE that is connected with the network 103. Further, the network 103 may include various network entities such as a Public Land Mobile Network (PLMN) which may be accessed over 3GPP access or with a non-3GPP (N3GPP) access for establishment of the connection with the UEs 101.

Accordingly, the UE 101 receives the Network Slice Selection Assistance Information (NSSAI) in an activate default eps bearer which is rejected NSSAI in 5G. The UE 101 might obtain one or more rejected Single Network Slice Selection Assistance Information (S-NSSAIs) with cause and validity of rejection from the Access and Mobility Management Function (AMF). An S-NSSAI may be rejected:

for the entire Public Land Mobile Network (PLMN); or
for the current Registration Area.

While the UE 101 remains RM-REGISTERED in the PLMN and regardless of the access type, the UE 101 shall not re-attempt to register to an S-NSSAI rejected for the entire PLMN until this rejected S-NSSAI is deleted.

Further, a Network Slice Admission Control Function (NSACF), which is one of the network entities inside the network 103, monitors and controls a number of registered UEs per network slice and a number of Protocol Data Unit (PDU) sessions per network slice for network slices that are subject to Network Slice Admission Control (NSAC). The NSACF is also configured with the information indicating which access type is specified for the S-NSSAI subject to NSACF (i.e., 3GPP Access Type, Non-3GPP Access Type, or both).

FIG. 2 illustrates a flow diagram 200 depicting a UE 101 considering rejected NSSAI irrespective of access type, according to an existing technique. As can be seen while the UE 101 remains RM-REGISTERED in the PLMN and regardless of the Access Type, the UE 101 shall not re-attempt to register to the S-NSSAI rejected for the entire PLMN until this rejected S-NSSAI is deleted.

In this current scenario, as shown in step 205, over a 3GPP access type there is an ongoing PDU session for the S-NSSAI-A between UE 101 and 3GPP PLMN-A 203. In an exemplary scenario, if the UE 101 wants to connect with the PLMN-A over N3GPP 201 access, then the UE 101 sends a Registration Request with requested NSSAI as the S-NSSAI-A at step 207. In response the UE 101 receives "S-NSSAI not available due to maximum number of UEs reached" on N3GPP access as shown in step 209. The UE 101 then puts the S-NSSAI-A in the rejected list (i.e., rejected NSSAI for the maximum number of UEs reached), in this embodiment the rejected list refers to rejected NSSAI for the maximum number of UEs reached. Thus, at step 211 the UE 101 puts the S-NSSAI-A in the rejected list thereby the UE 101 disconnects the ongoing PDU session i.e., disconnects the PDU-A as the S-NSSAI-A is in the rejected NSSAI list. In particular, the UE 101 may consider the ongoing PDU session of 3GPP access to drop and never request for the PDU session in any access which might use the S-NSSAI-A network slice. This will cause disruption of ongoing service on 3GPP access, as shown in step 215. Similarly, the same situation can happen on non-3GPP access for vice versa case.

Accordingly, there is a need for a mechanism for the UE that should provide at least the following mechanism of:
  identifying that "S-NSSAI not available due to maximum number of UEs reached" is rejected for which access,
  handling storage of a list of S-NSSAI of respective access type,
  actions to be perform based on storage.

Therefore, there is need for a mechanism to overcome the above-identified issues.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

In an implementation, the present subject matter refers to a method and system in the User Equipment (UE) for maintaining rejected network slice selection assistance information (NSSAI) for Single Network Slice Selection Assistance Information (S-NSSAI) not available due to maximum number of UEs reached per access type. The method comprises receiving a Non-Access Stratum (NAS) message including at least one of a registration accept, a registration reject or a CONFIGURATION UPDATE COMMAND message along with at least one of a rejected Single Network Slice Selection Assistance Information (S-NSSAI(s)) information and a cause for the S-NSSAI not available due to maximum number of UEs reached from a network. Thereafter, the method includes determining by the UE an access type on which the rejected S-NSSAI(s) is applicable based on the received S-NSSAI(s) information and then maintaining a storage of the rejected NSSAI for the S-NSSAI not available due to the maximum number of the UEs reached per access type based on the determination. The method further includes performing actions by the UE 101 based on the stored rejected NSSAI.

To further clarify the advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
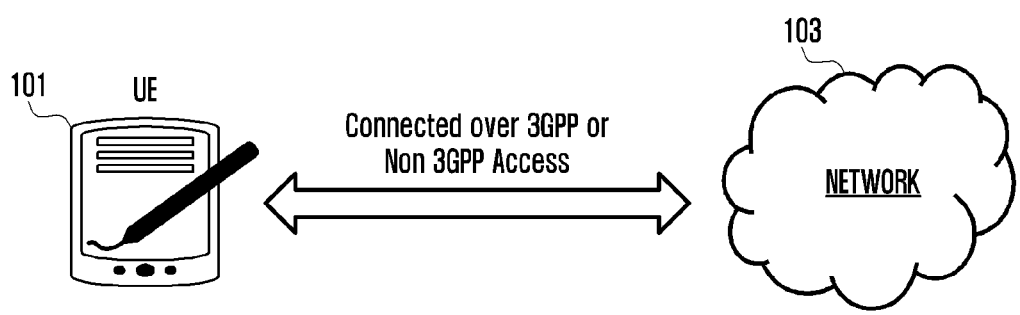
FIG. 1 illustrates an exemplary network environment of the User Equipment (UE) connected with a network, according to the state of the art.
Figure 2:
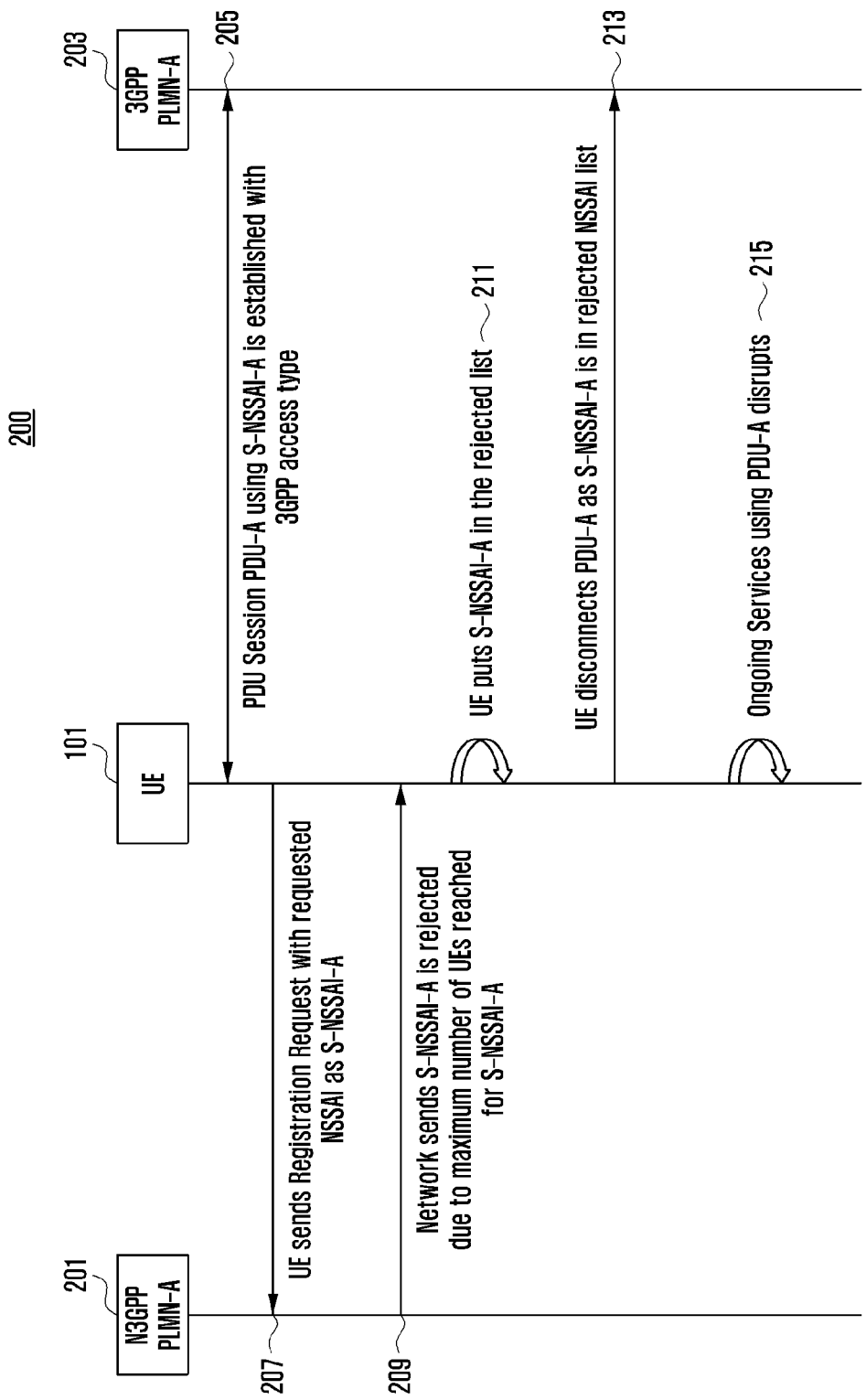
FIG. 2 illustrates a flow diagram depicting a UE considering rejected NSSAI irrespective of access type, according to an existing technique.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the present disclosure will be described below in detail with reference to the accompanying drawings.

The present disclosure provides a method in the UE that may maintain a rejected NSSAI list per access type and NSACF access control that will be applied per access type or irrespective of the access type. In particular, the UE 101 may maintain a different rejected NSSAI list per access type to overcome the discontinuity issue of the ongoing services or hampering of usage of future services involving a particular NSSAI for the rejected S-NSSAI due to "S-NSSAI not available due to maximum number of UEs reached". The NSACF may maintain the count per access type or maintain the count of all the access types. But the UE 101 is not aware about the method applied by the NSACF whether it will apply per access type count or maintain the count of all the access types. Thus, on the UE side it may be more beneficial to apply the method per access type because it has limited impact to the system. For example, if the NSACF is applying the count per access type and rejecting it after reaching the threshold then there is no issue—the UE is also maintaining the count per access type. In another method if the NSACF is rejecting when the count of all the access types reaches the maximum value then there is also no harm if the UE is maintaining the count per access type because this implies that for the current access type the maximum has been reached. Thus, it is beneficial for the UE 101 to maintain the rejected NSSAI for the maximum number of UEs reached per access type so that it can yield correct results irrespective of the method applied by the network i.e., the NSACF network function.

In an exemplary embodiment, if the S-NSSAI-A is rejected for the N3GPP access type with rejection cause as the maximum number of registered UEs for ongoing network slice is reached (also called as "S-NSSAI not available due to maximum number of UEs reached"), the UE can consider putting the S-NSSAI-A in the rejected NSSAI list for the N3GPP access type only and this should not hamper any ongoing or future services in the S-NSSAI-A in 3GPP access or adding the S-NSSAI-A in the requested NSSAI list in 3GPP access provided the S-NSSAI-A is not in the rejected NSSAI list of 3GPP access.

Figure 3:
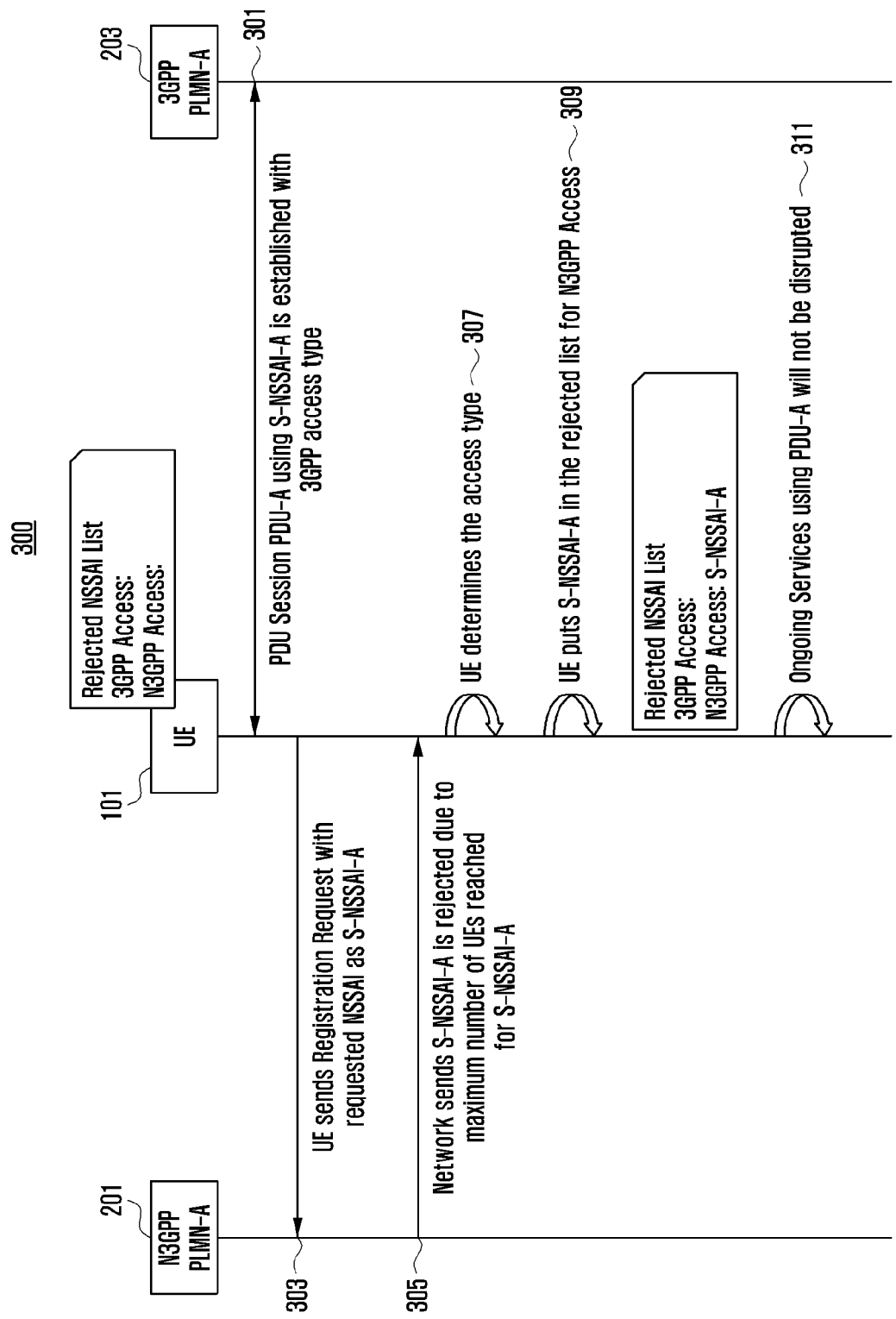
FIG. 3 illustrates a flow diagram depicting an exemplary embodiment of a UE maintaining rejected NSSAI list per access type, in accordance with an embodiment of the present disclosure.

FIG. 3 illustrates a flow diagram 300 depicting an exemplary embodiment of a UE maintaining the rejected NSSAI list per access type, in accordance with an embodiment of the present disclosure. As depicted, the flow diagram 300 includes an N3GPP PLMN-A 201, the UE 101, and a 3GPP PLMN-A 203. The reference numerals were kept same throughout the disclosure for ease of explanation.

According to an embodiment, the UE 101 may be initially configured to connect (i.e., register) with the 3GPP PLMN-A 203. This implies that the UE 101 is registering with PLMN-A over 3GPP access. The UE 101 may include, but not limited to, a mobile phone, a smart watch, a tablet, and any other electronic device which is capable of connecting to any 3GPP or any N3GPP network such as the N3GPP PLMN-A 201 and the 3GPP PLMN-A 203. Further, the depicted 3GPP PLMN-A 203 may include one or more network entities of 4G and 5G network, respectively. For example, the 3GPP PLMN-A 201 may include, but not limited to, a Mobility Management Function (MME). Similarly, the 3GPP PLMN-A 203 may include, but not limited to, Access and Mobility Function (AMF), Session Management Function (SMF), etc.

As shown in FIG. 3, initially at step 301 a PDU Session PDU-A using the S-NSSAI-A is considered to be established with 3GPP access type between the UE 101 and the 3GPP PLMN-A 203. In an exemplary scenario, if the UE 101 wants to connect with the N3GPP PLMN-A 201 over an N3GPP access type, then the UE 101 sends a Registration Request with the requested NSSAI as the S-NSSAI-A at step 303.

In response at step 305, the UE 101 receives a Non-Access Stratum (NAS) message from the N3GPP PLMN-A 201. The NAS message may include but not limited to, a registration accept, a registration reject or a CONFIGURATION UPDATE COMMAND message along with at least one of a rejected Single Network Slice Selection Assistance Information (S-NSSAI(s)) information and a cause for the S-NSSAI not available due to maximum number of UEs reached. For example, if the S-NSSAI-A is rejected for the non-3GPP (N3GPP) access type with the rejection cause as the maximum number of registered UEs for ongoing network slice is reached, also referred to as "S-NSSAI not available due to maximum number of UEs reached", and the reject cause (in general the reject cause should be taken as an indication in this embodiment) is received by the UE in the NAS message like Registration accept, registration reject or UE configuration update over the non-3GPP access.

After the step 305, at step 307, the UE 101 determines an access type on which the rejected S-NSSAI(s) is applicable. The access type is determined from the received S-NSSAI (s) information at step 305. In an implementation for the determination of the access type includes the UE 101 identifying the access type on which the NAS message is received. As explained above the NAS message includes the rejected S-NSSAI(s) information and the cause of the S-NSSAI not available due to the maximum number of UEs reached. After identifying, the UE 101 associates the rejected S-NSSAI(s) to the corresponding identified access type. That is to say for which access type the S-NSSAI(s) is being rejected and the reason or cause for rejection being non availability of the S-NSSAI due to the maximum number of UEs is being reached.

Thus, after determining the access type, at step 309 the UE 101 maintains a storage of the rejected NSSAI for the S-NSSAI not available due to the maximum number of the UEs reached per access type. In an implementation for maintaining the storage of the rejected NSSAI for the S-NSSAI, the UE 101 identifies the access type on which the rejected S-NSSAI(s) is applicable. After identifying, the UE 101 stores separately the rejected S-NSSAI(s) along with the identified corresponding access type in the rejected NSSAI for the S-NSSAI not available due to the maximum number of UEs reached per access type. According to an embodiment, the rejected NSSAI for the S-NSSAI not available due to the maximum number of UEs reached per access type is stored as a network slicing information.

Thus, according to the embodiment, the UE 101 maintains the rejected NSSAI list per access type. Thus, the UE 101 will put the S-NSSAI-A in the rejected NSSAI list for N3GPP access type only and this should not hamper any ongoing or future services in the S-NSSAI-A in 3GPP access or adding the S-NSSAI-A in the requested NSSAI list in the 3GPP access provided the S-NSSAI-A is not in the rejected NSSAI list of the 3GPP access already.

According to another exemplary embodiment, consider a scenario where the UE 101 is initially at step 301 a PDU Session PDU-A using the S-NSSAI-A is considered to be established with a N3GPP access type between the UE 101 and the N3GPP PLMN-A 201. Further, if the UE 101 wants to connect with the 3GPP PLMN-A 203 over an 3GPP access type, then the UE 101 sends a Registration Request with requested NSSAI as the S-NSSAI-A at step 303. In response at step 305 the UE 101 receives a Non-Access Stratum (NAS) message from the 3GPP PLMN-A 203. Accordingly, the steps 307 and 309 that are performed at the UE are the same. However, the only change here is that the NAS message is now received from the 3GPP PLMN-A 203 over a 3GPP access and the UE 101 is already connected with the N3GPP PLMN-A 201.

In an implementation, if the S-NSSAI-A is rejected for the 3GPP access type with the rejection cause as "S-NSSAI not available due to maximum number of UEs reached" and the reject cause (in general the reject cause should be taken as an indication in this embodiment) is received by the UE 101 in the NAS message like Registration accept, registration reject or UE configuration update over the non-3GPP access. Thus, the UE 101 will put the S-NSSAI-A in the rejected NSSAI list for the 3GPP access type only and this should not hamper any ongoing or future services in the S-NSSAI-A in the N3GPP access or adding the S-NSSAI-A in the requested NSSAI list in the N3GPP access provided the S-NSSAI-A is not in the rejected NSSAI list of N3GPP access. Thus, the UE 101 may be configured to maintain a different rejected NSSAI list per access type to overcome as discontinuity of ongoing services or hampering of usage of future services involving the particular NSSAI for the rejected S-NSSAI due to "S-NSSAI not available due to maximum number of UEs reached". This list can be referred to as "rejected NSSAI for the maximum number of UEs reached for 3GPP access" or rejected NSSAI for the maximum number of UEs reached for non-3GPP access" or the rejected NSSAI list for 3GPP access type or the rejected NSSAI list for non-3GPP access or like so but the meaning of application remains the same. Thus, as an example, a list including the rejected NSSAI for the S-NSSAI not available due to the maximum number of the UEs reached for the 3GPP access type may be referred as a first list and a list including the rejected NSSAI for the S-NSSAI not available due to the maximum number of the UEs reached for the non 3GPP access type may be referred as a second list. In this embodiment list is just an example but in general the UE 101 will track the rejected slice that is rejected for which access.

According to the further embodiment, at step 311 the UE 101 performs various actions based on the stored rejected NSSAI. In an implementation, the various actions performed by the UE 101 includes prohibiting a usage of the rejected NSSAI for the S-NSSAI not available due to the maximum number of UEs reached, respective of each access type for a current Public Land Mobile Network (PLMN) or a current registration area of the UE, until a condition is satisfied. The condition includes one of switching of the UE, a removal of a Universal Integrated Circuit Card (UICC) containing a Universal Subscriber Identity Module (USIM), or an update in a list of subscriber data with a Stand-alone Non-Public Network (SNPN) identity of a current SNPN or the rejected S-NSSAI(s) are removed.

Thus in particular, the UE 101 shall add the rejected S-NSSAI(s) in the rejected NSSAI for the maximum number of UEs reached per access type and shall not attempt to use this S-NSSAI in the current PLMN over the respective access type for which the rejected NSSAI was received until conditions such as the switching off the UE, the UICC containing the USIM is removed, the entry of the "list of subscriber data" with the SNPN identity of the current SNPN is updated, or the rejected S-NSSAI(s) are removed when a timer T3526 is expired. For example, if the rejected NSSAI is the S-NSSAI-A is present in "rejected NSSAI list for non-3GPP access" and not present in "rejected NSSAI list for 3GPP access" the UE 101 shall not include the S-NSSAI-A in the requested NSSAI as part of the registration procedure over non-3GPP access, but the UE 101 is allowed to access (i.e., include) the S-NSSAI-A over 3GPP access. Similarly, if rejected the NSSAI is the S-NSSAI-A is present in "rejected NSSAI list for 3GPP access" and not present in "rejected NSSAI list for non-3GPP access" the UE 101 shall not include the S-NSSAI-A in the requested NSSAI as part of the registration procedure over 3GPP access, but the UE 101 is allowed to access S-NSSAI-A over non-3GPP access.

In a further example, if the UE 101 receives "rejected NSSAI for the maximum number of UEs reached" indication over the 3GPP access, for example the S-NSSAI-A if there are any active PDU sessions related to the S-NSSAI-A over the 3GPP access the UE 101 shall release those PDU sessions. If there are any active PDU sessions related to the S-NSSAI-A over the non-3GPP access the UE shall continue to send or receive data over them and there is no impact.

If UE 101 receives "rejected NSSAI for the maximum number of UEs reached" indication over the non-3GPP access" for example the S-NSSAI-A if there are any active PDU sessions related to the S-NSSAI-A over the non-3GPP access the UE shall release those PDU sessions. If there are any active PDU sessions related to the S-NSSAI-A over the 3GPP access the UE 101 shall continue to send or receive data over them and there is no impact.

Thus, the UE 101 understands "rejected NSSAI for the maximum number of UEs reached" is for a respective access type (3GPP access or non-3GPP access) when this cause or indication is provided to the UE over the same access using the NAS message. For example, if "rejected NSSAI for the maximum number of UEs reached" is received on a NAS message over 3GPP access then that is applicable for 3GPP access.

In yet another embodiment the network can provide a dedicated indication to the UE that this "rejected NSSAI for the maximum number of UEs reached" is applicable in which access. i.e., the network can send a NAS message over either 3GPP access or non-3GPP access and indicate cause e.g., "rejected NSSAI for the maximum number of UEs reached"+provide the one or more S-NSSAI ID e.g., S-NSSAI-A+Provide rejected slice is for which access type i.e., 3GPP access, non-3GPP access or both.

Accordingly, at step 311, the ongoing services using PDU-A will not be disrupted as explained above.

Figure 4:
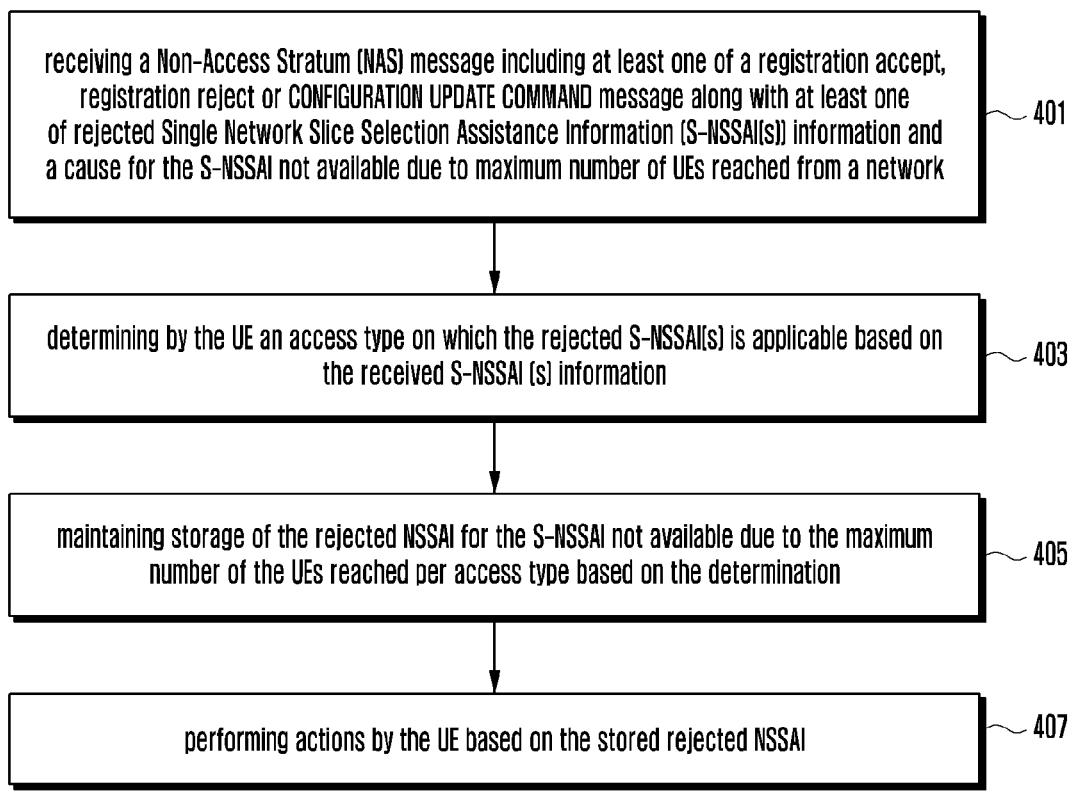
FIG. 4 illustrates a flow chart for maintaining rejected network slice selection assistance information (NSSAI) per access type, according to an embodiment of the present disclosure.

FIG. 4 illustrates a flow chart for maintaining rejected network slice selection assistance information (NSSAI) per access type, according to an embodiment of the present disclosure. The method 400 as shown in the figure is implemented in the UE 101. Further, the method 400 will be explained with reference to the FIG. 3. Further, a detailed description of the method 400 is omitted here for the sake of brevity.

At step 401, the UE 101 receives the Non-Access Stratum (NAS) message including at least one of a registration accept, a registration reject or a CONFIGURATION UPDATE COMMAND message along with at least one of a rejected Single Network Slice Selection Assistance Information (S-NSSAI(s)) information and a cause for the S-NSSAI not available due to a maximum number of UEs reached from a network. As an example, the network may include network entity 3GPP PLMAN-A 203 and N3GPP PLMAN-A 201. The Step 401 corresponds to the step 305 of FIG. 3.

Thereafter at step 403, the UE 101 determines an access type on which the rejected S-NSSAI(s) is applicable based on the received S-NSSAI(s) information. The Step 403 corresponds to the step 307 of FIG. 3.

Thereafter at step 405, the UE 101 maintains the storage of the rejected NSSAI for the S-NSSAI not available due to the maximum number of the UEs reached per access type based on the determination. The Step 405 corresponds to the step 309 of FIG. 3.

After the step 405, the UE 101 performs actions based on the stored rejected NSSAI. The various actions are explained in the above paragraphs therefore omitted here for the sake of brevity.

According to a further embodiment, the NSACF may be configured to control i.e., increase, or decrease the current number of PDU sessions per network slice so that it does not exceed the maximum number of PDU sessions allowed to be served by that network slice. When the current number of PDU sessions with the network slice is to be increased, the NSACF first checks whether the maximum number of PDU sessions per network slice for that network slice has already been reached. The problem with this approach is that the UE's registered network slice is maintained per S-NSSAI-A, but PDU sessions are cumulative of both the registered slices across the access type. For example:

S-NSSAI-A is registered on 3GPP access and the S-NSSAI-A is registered on non-3GPP access type.

NSACF counts the slice registered for the UE as 2.

PDU-1, PDU-2 is established over the S-NSSAI-A of 3GPP access and PDU-3, PDU-4 is established over the S-NSSAI-A of N3GPP access.

Thus, the number of PDU sessions established is 4 for the S-NSSAI-A though those are established over different access, and this can give a wrong count for the NSACF. The anchor Session Management Function (SMF), when triggering a request to NSACF for maximum number of PDU sessions per network slice control during PDU session establishment/release procedures, may be configured to include the access type. So that NSACF may count the number of PDU sessions established per S-NSSAI per access type and maintain the accurate count in the 3GPP system per access type. The NSACF may maintain the count per access type or maintain the count of all the access types. But the UE 101 is not aware about the method applied by the NSACF whether it will apply per access type count or maintain the count of all the access types. Thus, on the UE side it may be more beneficial to apply the method per access type because it has limited impact to the system. For example, if the NSACF is applying the count per access type and rejecting it after reaching the threshold then there is no issue—the UE is also maintaining the count per access type. In another method if the NSACF is rejecting when the count of all the access types reaches the maximum value then there is also no harm if the UE is maintaining the count per access type because this implies that for the current access type the maximum has been reached. Thus, it is beneficial for the UE 101 to maintain the rejected NSSAI for the maximum number of UEs reached per access type so that it can yield correct results irrespective of the method applied by the network i.e., the NSACF network function.

Figure 5:
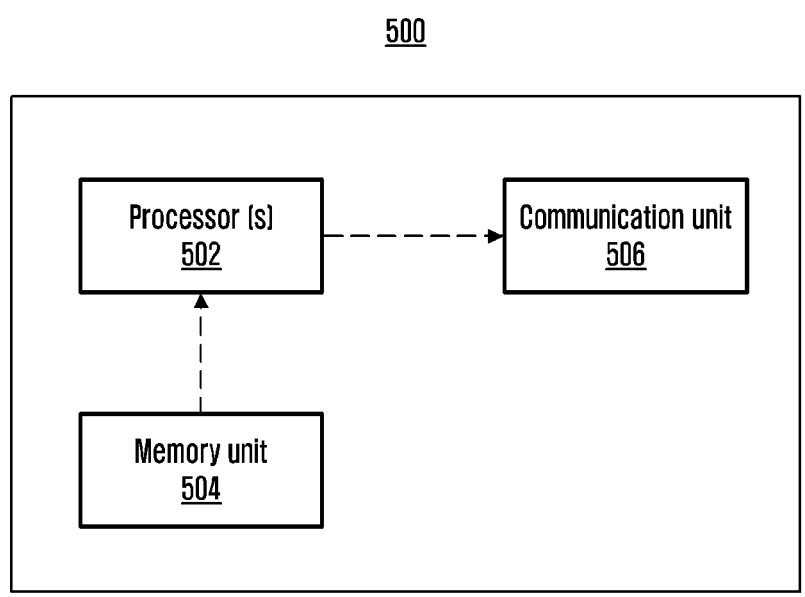
FIG. 5 illustrates an exemplary diagram of a network, according to an embodiment of the present disclosure.

FIG. 5 illustrates an exemplary diagram of a network, according to an embodiment of the present disclosure. The network 500 may correspond to 3GPP PLMN-A and/or N3GPP PLMN-A, as discussed throughout this disclosure. The network 500 may include at least one processor 502, a memory unit 504 (e.g., storage), and a communication unit 506 (e.g., communicator or communication interface). Further, the network 500 may also include the Cloud-RAN (C-RAN), a Central Unit (CU), a core Network (NW), a Distributed unit (DU) or the any other possible network (NW) entity. The communication unit 506 may perform one or more functions for transmitting and receiving signals via a wireless channel.

As an example, the processor 502 may be a single processing unit or a number of units, all of which could include multiple computing units. The processor 502 may be implemented as one or more microprocessors, microcomputers, microcontrollers, digital signal processors, central processing units, state machines, logic circuitries, and/or any devices that manipulate signals based on operational instructions. Among other capabilities, the processor 502 is configured to fetch and execute computer-readable instructions and data stored in the memory. The processor 502 may include one or a plurality of processors. At this time, one or a plurality of processors 502 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 502 may control the processing of the input data in accordance with a predefined operating rule or artificial intelligence (AI) model stored in the non-volatile memory and the volatile memory, i.e., memory unit 504. The predefined operating rule or artificial intelligence model is provided through training or learning.

The memory 504 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 6:
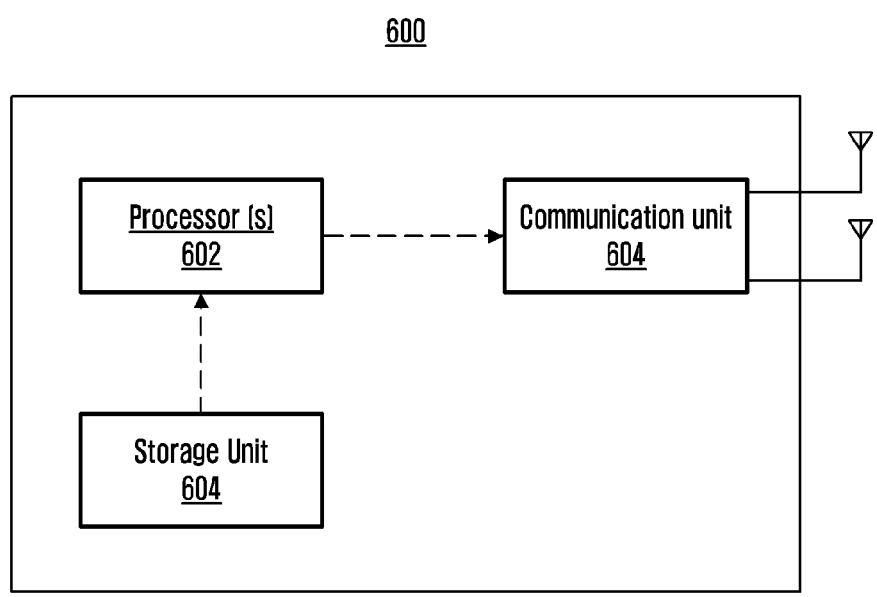
FIG. 6 illustrates a diagram of the configuration of a user equipment (UE) in a wireless communication system, according to an embodiment of the present disclosure.

FIG. 6 is a diagram illustrating the configuration of a user equipment (UE) in a wireless communication system, according to an embodiment of the present disclosure. The configuration of FIG. 6 may be understood as a part of the configuration of the UE 600. Hereinafter, it is understood that terms including "unit" or "module" at the end may refer to the unit for processing at least one function or operation and may be implemented in hardware, software, or a combination of hardware and software.

Referring to FIG. 6, the UE 600 may include at least one processor 602, a communication unit 604 (e.g., communicator or communication interface), and a storage unit 606 (e.g., storage). By way of example, the UE 600 may be a User Equipment, such as a cellular phone or other device that communicates over a plurality of cellular networks (such as a 3G, 4G, a 5G or pre-5G, 6G network or any future wireless communication network). The communication unit 604 may perform functions for transmitting and receiving signals via a wireless channel.

As an example, the processor 602 may be a single processing unit or a number of units, all of which could include multiple computing units. The processor 602 may be implemented as one or more microprocessors, microcomputers, microcontrollers, digital signal processors, central processing units, state machines, logic circuitries, and/or any devices that manipulate signals based on operational instructions. Among other capabilities, the processor 602 is configured to fetch and execute computer-readable instructions and data stored in the memory. The processor 602 may include one or a plurality of processors. At this time, one or a plurality of processors 602 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 602 may control the processing of the input data in accordance with a predefined operating rule or artificial intelligence (AI) model stored in the non-volatile memory and the volatile memory, i.e., memory unit 604. The predefined operating rule or artificial intelligence model is provided through training or learning.

The memory 604 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a user equipment (UE) in a wireless communication system, the method comprising:
receiving, from an access and mobility management function (AMF) over a first access type, a Non-Access Stratum (NAS) message including a rejected single network slice selection assistance information (S-NSSAI) with a cause for the S-NSSAI not allowable due to maximum number of UEs reached;
storing the rejected S-NSSAI in a rejected network slice assistance information (NSSAI) list for at least one rejected S-NSSAI due to maximum number of UEs reached, wherein the rejected NSSAI list is maintained per access type; and
determining whether to attempt to request an S-NSSAI in a registration procedure over the access type based on whether the S-NSSAI is stored in the rejected NSSAI list for the access type for the registration procedure,
wherein the access type is one of a 3rd generation partnership project (3GPP) access or a non-3GPP access.

2. The method of claim 1, wherein:
in case that the access type for the S-NSSAI is the first access type which is associated with the rejected NSSAI list including the S-NSSAI, the UE does not attempt to use the S-NSSAI in a current public land mobile network (PLMN), and
in case that the access type for the S-NSSAI is a second access type which is not associated with the rejected NSSAI list including the S-NSSAI, the UE attempts to use the S-NSSAI in the current PLMN.

3. The method of claim 2, wherein
in case that the access type for the S-NSSAI is the first access type, the UE does not attempt to use the S-NSSAI in the current PLMN until the UE is switched off, a universal integrated circuit card (UICC) containing a universal subscriber identity module (USIM) is removed, an entry of a list of subscriber data with a stand-alone non-public network (SNPN) identity of a current SNPN is updated, or the rejected S-NSSAI is removed.

4. The method of claim 1, wherein the NAS message includes at least one of a registration accept message, a registration reject message, or a configuration update command message.

5. The method of claim 1, wherein the rejected S-NSSAI in the rejected NSSAI for the maximum number of UEs reached is considered rejected for a current public land mobile network (PLMN) or stand-alone non-public network (SNPN) per access type independently.

6. The method of claim 1, wherein the S-NSSAI is rejected for the cause as maximum number of registered UEs for ongoing network slice is reached.

7. A user equipment (UE) in a wireless communication system, the UE comprising:
a transceiver; and
a controller configured to:
receive, from an access and mobility management function (AMF) over a first access type, a non-access stratum (NAS) message including a rejected single network slice selection assistance information (S-NSSAI) with a cause for the S-NSSAI not allowable due to maximum number of UEs reached;
store the rejected S-NSSAI in a rejected network slice assistance information (NSSAI) list for at least one rejected S-NSSAI due to maximum number of UEs reached, wherein the rejected NSSAI list is maintained per access type; and
determine whether to attempt to request an S-NSSAI in a registration procedure over the access type based on whether the S-NSSAI is stored in the rejected NSSAI list for the access type for the registration procedure.

8. The UE of claim 7, wherein: in case that the access type which is associated with the rejected NSSAI list including the S-NSSAI for the S-NSSAI is the first access type, the UE does not attempt to use the S-NSSAI in a current public land mobile network (PLMN), and
in case that the access type for the S-NSSAI is a second access type which is not associated with the rejected NSSAI list including the S-NSSAI, the UE attempts to use the S-NSSAI in the current PLMN.

9. The UE of claim 8, wherein:
in case that the access type for the S-NSSAI is the first access type, the UE does not attempt to use the S-NSSAI in the current PLMN until the UE is switched off, a universal integrated circuit card (UICC) containing a universal subscriber identity module (USIM) is removed, an entry of a list of subscriber data with a stand-alone non-public network (SNPN) identity of a current SNPN is updated, or the rejected S-NSSAI is removed.

10. The UE of claim 7, wherein the NAS message includes at least one of a registration accept message, a registration reject message, or a configuration update command message.

11. The UE of claim 7, wherein the rejected S-NSSAI in the rejected NSSAI for the maximum number of UEs reached is considered rejected for a current public land mobile network (PLMN) or stand-alone non-public network (SNPN) per access type independently.

12. The UE of claim 7, wherein the S-NSSAI is rejected for the cause as maximum number of registered UEs for ongoing network slice is reached.

* * * * *